(12) United States Patent
Li

(10) Patent No.: US 10,368,213 B1
(45) Date of Patent: Jul. 30, 2019

(54) LOCATION-BASED OPEN SOCIAL NETWORKS

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 0 days.

(21) Appl. No.: 16/255,831

(22) Filed: Jan. 24, 2019

Related U.S. Application Data

(63) Continuation-in-part of application No. 16/112,702, filed on Aug. 25, 2018.

(51) Int. Cl.
| | |
|---|---|
| *H04W 24/00* | (2009.01) |
| *H04W 4/21* | (2018.01) |
| *H04L 29/06* | (2006.01) |
| *G06F 16/954* | (2019.01) |
| *H04W 4/021* | (2018.01) |

(52) U.S. Cl.
CPC ............ *H04W 4/21* (2018.02); *G06F 16/954* (2019.01); *H04L 67/38* (2013.01); *H04W 4/021* (2013.01)

(58) Field of Classification Search
CPC ......... H04L 67/22; H04L 67/18; H04L 67/02; H04L 67/10; H04W 64/006; H04W 8/005
USPC ............................. 455/456.1–456.3; 370/338
See application file for complete search history.

(56) References Cited

U.S. PATENT DOCUMENTS

| | | | | |
|---|---|---|---|---|
| 9,648,114 | B2 * | 5/2017 | Carmichael | G06Q 50/01 |
| 2015/0245168 | A1 * | 8/2015 | Martin | H04W 4/02 |
| | | | | 715/751 |

* cited by examiner

*Primary Examiner* — Marcos Batista

(57) ABSTRACT

Systems and methods for open social networks configured for a location or a region. The social networks are arranged accessible to all users via an interactive map or a website link. In one aspect, user numbers or post quantities are displayed beside network icons on a map. In another aspect, posts generated by local and remote users are presented in separate windows. In yet another aspect, social networks are searchable via keywords or category in a map setting. In yet another aspect, for a given period of time, a user continuously receives content presented at a social network which has the most users. Moreover, social networks which have popular virtual reality or augmented reality content are selected and presented upon request.

20 Claims, 9 Drawing Sheets

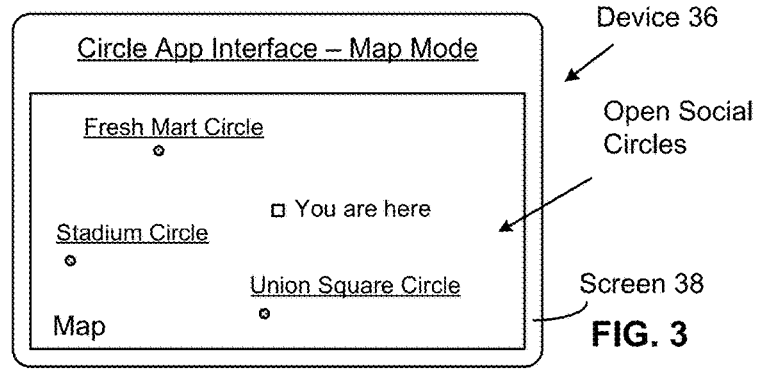
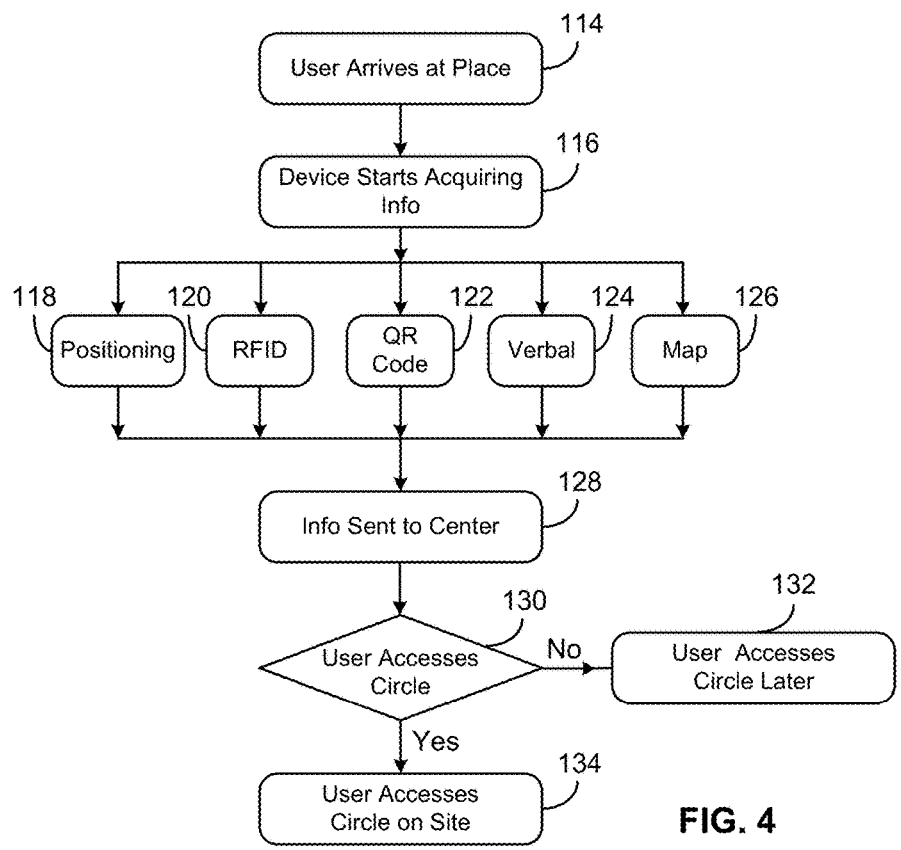
FIG. 3
FIG. 4

LOCATION-BASED OPEN SOCIAL NETWORKS

CROSS REFERENCE TO RELATED APPLICATION

This is a continuation-in-part of U.S. patent application Ser. No. 16/112,702, filed Aug. 25, 2018, which is a continuation-in-part of U.S. patent application Ser. No. 15/226,924, filed Aug. 3, 2016, now U.S. Pat. No. 10,116,757, granted Oct. 30, 2018.

FEDERALLY SPONSORED RESEARCH

Not applicable

SEQUENCE LISTING OR PROGRAM

Not applicable

BACKGROUND

Field of Invention

This invention relates to social network, and more specifically, to open social networks based upon location.

Description of Prior Art

A social networking system provides an online service, platform, or website that implements social networks, where users may share news, information, ideas, or feelings. A social networking environment is mostly web-based, and it enables users to interact with each other over the Internet, via online posts, instant or short messages, tweets, or emails. As smartphone system supports social networking environment and many users have a smartphone, social networks may be used as a new communication platform for almost all situations.

For instance, communication via social networks may complement face-to-face conversation among unknown users at a location. When a user is at a shopping mall, the user may want to exchange info with someone in there. When a user is at a train station, the user may want to know what happened when a train is delayed. A user may look around and find someone to ask a question. Alternatively, a user may post a question in a social circle designated to the location. For some, the latter may be easier to do, since it rids a user of shyness, awkwardness, and possible embarrassment. For a business, the latter provides another channel to communicate with customers aside from telephone, website, and email.

When a social network is employed as a contacting or communication platform, the openness and ease of use become important. But many social networks are exclusive, need to be found, and require registration or even a qualification process for enrollment.

Therefore, there exists a need for social network that is open, easy to find, and easy to access.

The word "post" as verb or "posting" is referred broadly as transmitting information from a user to a server via a communication network to let others in a certain environment, such as a social networking circle, access the transmitted information. The word "post" as noun includes information posted or submitted by a user on the Internet, or user generated content on the Internet or in any network. Posted information or content may cover a hyperlink or a uniform resource locator (URL), audio, video, an image, a text, a message, an e-mail, news article, blog entry, survey, etc. Posts are preferably hosted on a web site, but may also be hosted locally using local database or a local server system. In discussions below, messages, besides posts, are used sometime. "Message" as noun is considered equivalent to post.

OBJECTS AND ADVANTAGES

Accordingly, several main objects and advantages of the present invention are:

a). to provide improved location-based open social networks;
  b). to provide such social networks which are open to all users;
  c). to provide such social networks which display messages from a given time slot;
  d). to provide such social networks which maintain message quantity on display below a given limit;
  e). to provide such social networks which provide separate presentation windows for local and remote users;
  f). to provide such social networks which are searchable via keywords or category in a map setting;
  g). to provide such social networks which show the number of users who are accessing a network and/or the number of posts which are published in a network;
  h). to provide such a social network system which provides a user content presented at a network that has the most participants; and
  i). to provide such social networks which have popular virtual reality (VR) or augmented reality (AR) content.

Further objects and advantages will become apparent from a consideration of the drawings and ensuing description.

SUMMARY

In accordance with the present invention, methods and systems are proposed for location-based open social networks which are easy to find and easy to access. No registration procedures are needed for network enrolment. In one embodiment, being there enables a user to discover and access location-based networks easily. Meanwhile, all online users have access to location-based networks via an interactive map or a website link. In another embodiment, the user number or post quantity of a network is displayed to help a user select a network. For users who prefer controlled network content, a limit on message quantity may be arranged, or a time period may be chosen. Users are also able to search for network on a map directly using keywords or category. Messages from local and remote users are presented in different windows on screen for the convenience of viewing local info. In yet another aspect, a user receives continuously for a given period of time content presented at a popular social circle which has the most participants. Moreover, social networks which have more viewers of VR or AR content are selected and presented.

DRAWING FIGURES

FIG. 3 is a graphic diagram showing an embodiment of circle app interface, where social circles appear on map automatically in accordance with the present invention.

FIGS. 4 and 5 are exemplary flow diagrams showing embodiments of arranging and accessing a social network in accordance with the present invention.

Figure 7:
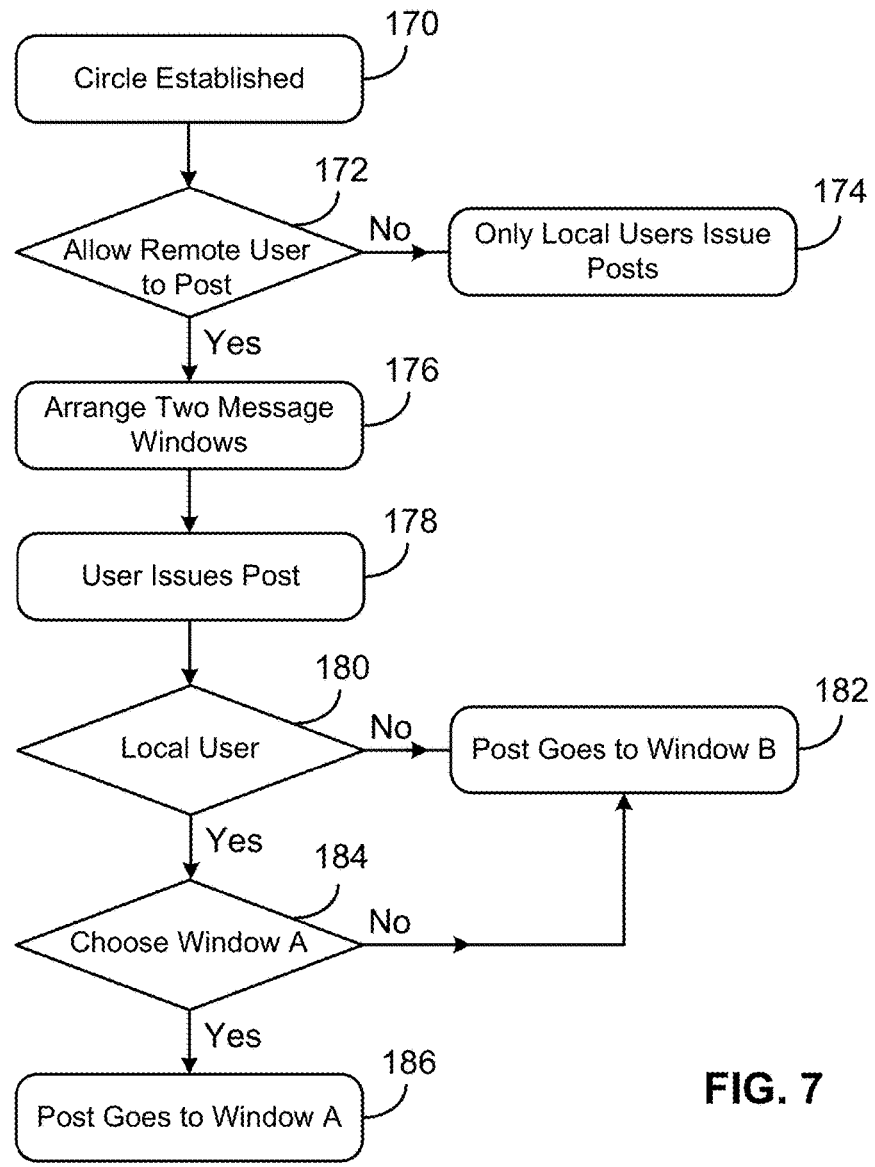
Figure 8:
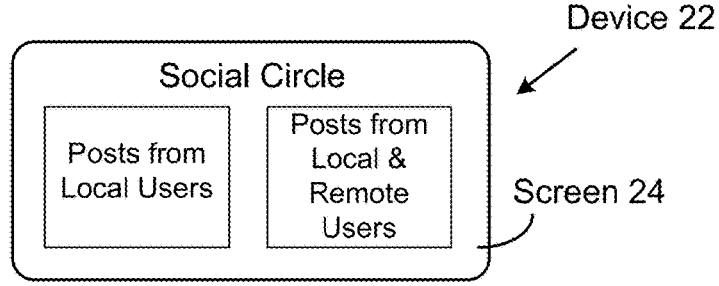

FIGS. 7 and 8 use an exemplary flow diagram and an exemplary graphic diagram to show embodiments of post management in accordance with the present invention.

Figure 9:
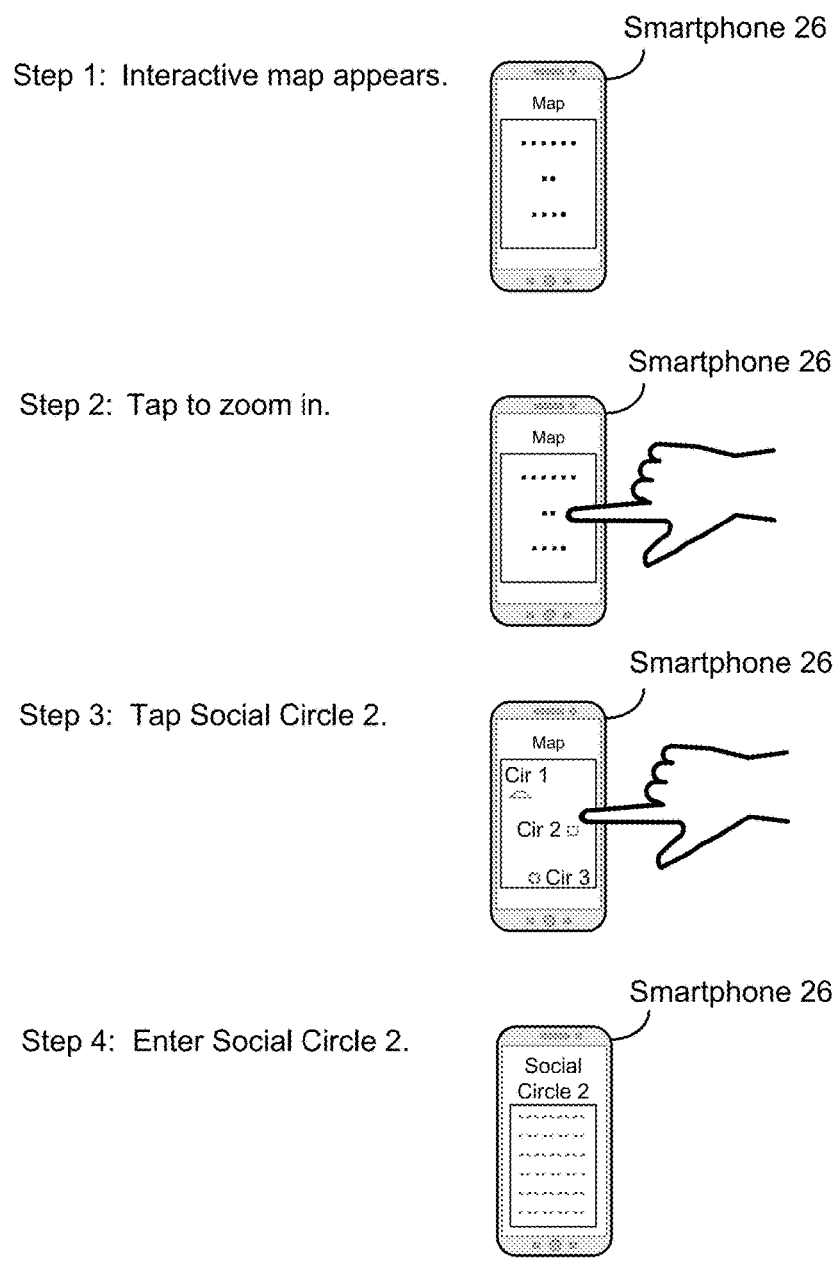

FIG. 9 uses graphic diagrams to show network access using an interactive map in accordance with the present invention.

Figure 10:
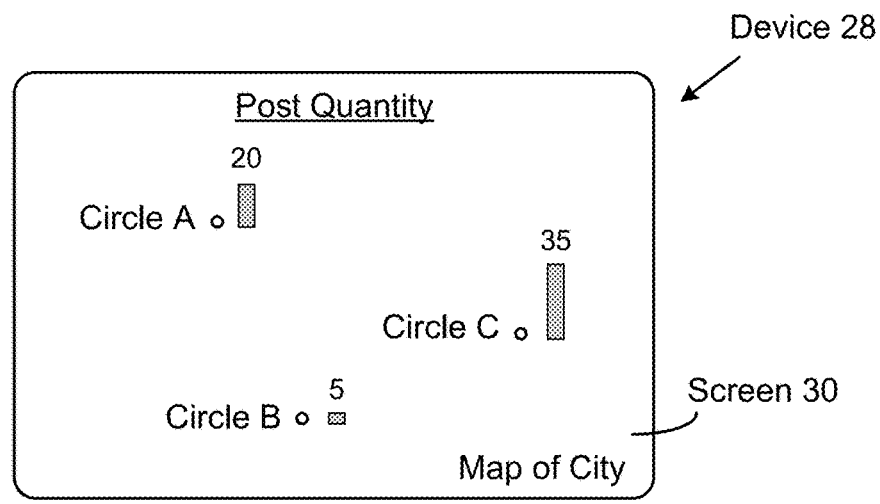
Figure 11:
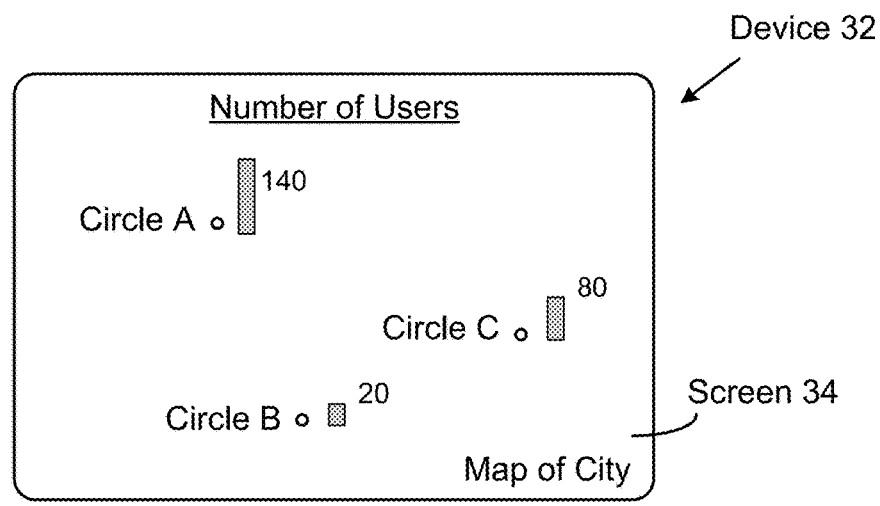

FIGS. 10 and 11 are graphic diagrams which show two embodiments of circle app interface, where certain status of social circle is presented in a map setting in accordance with the present invention.

Figure 12:
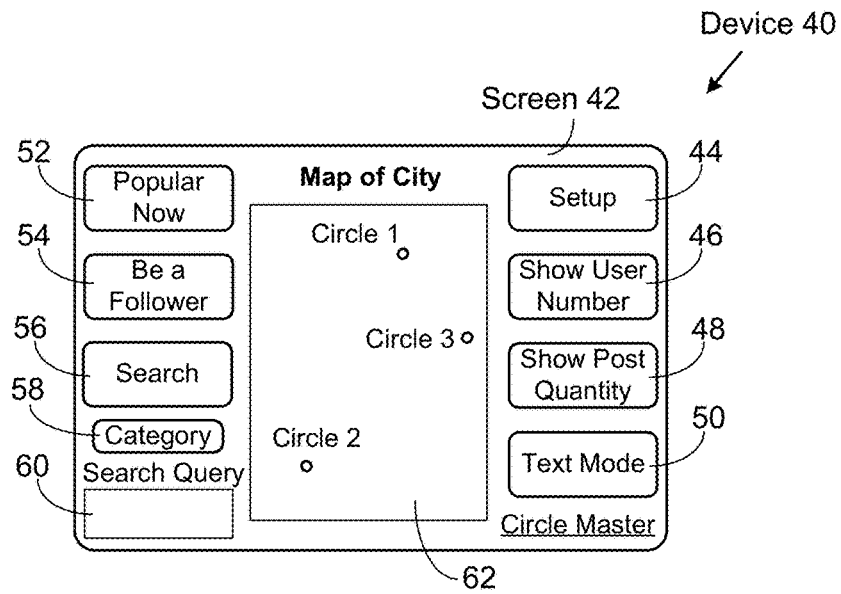
Figure 13:
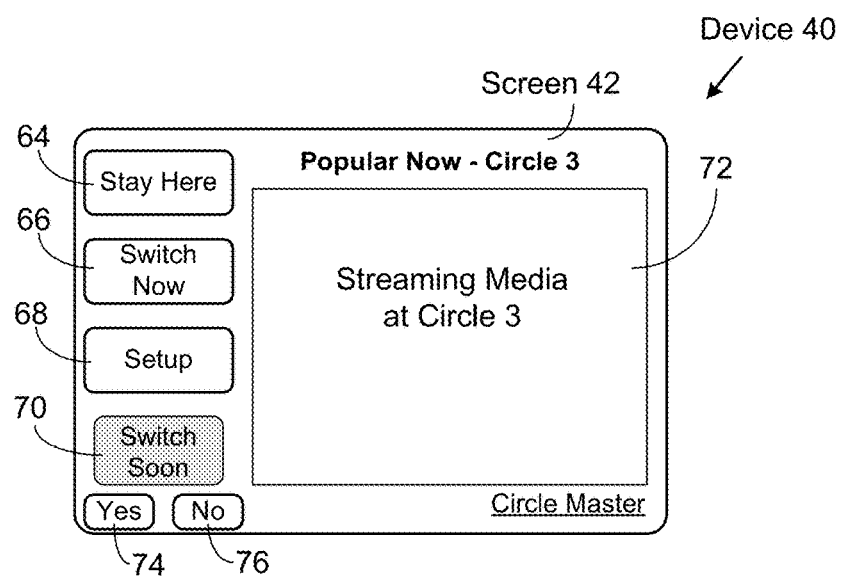

FIGS. 12 and 13 are graphic diagrams which show two embodiments of circle app interface, where options are presented in a map setting in accordance with the present invention.

Figure 14:
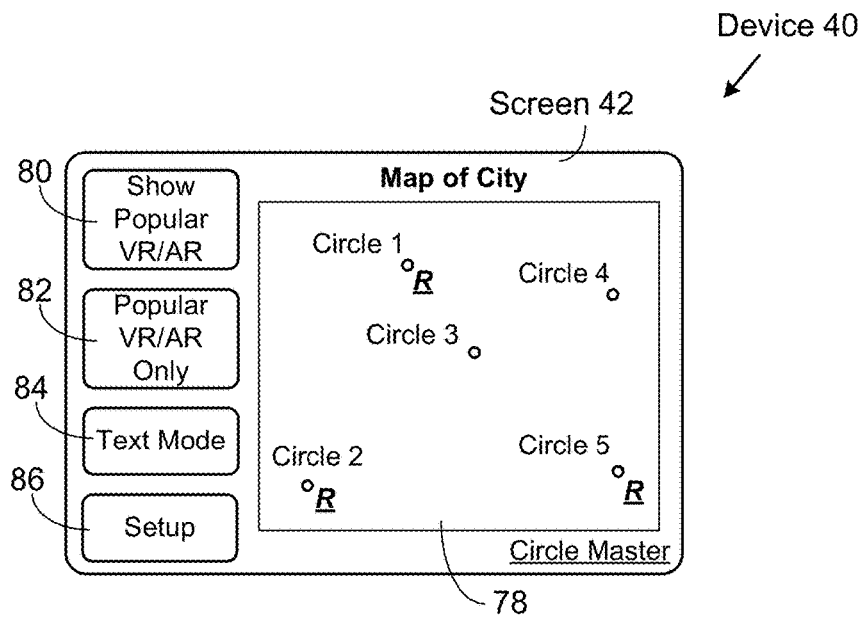
Figure 15:
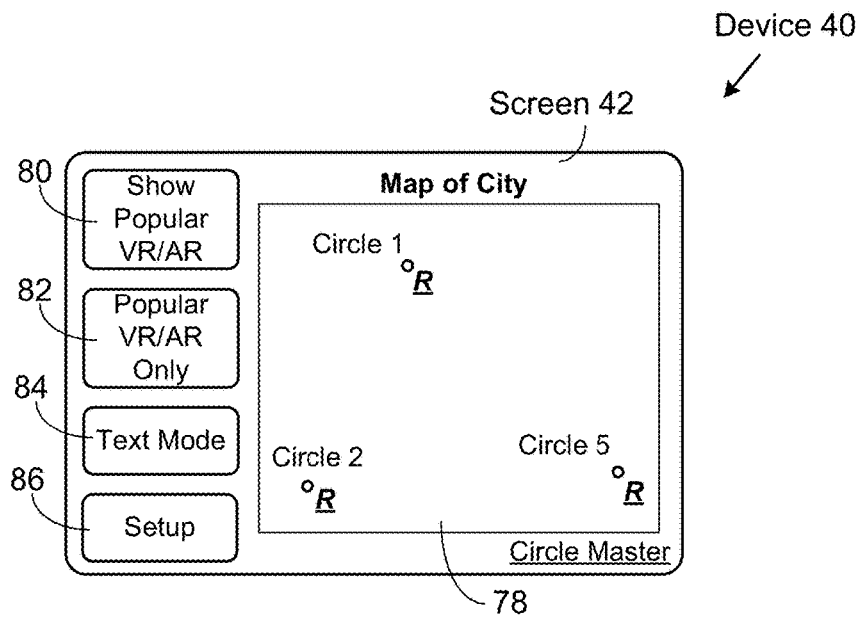

FIGS. 14 and 15 are graphic diagrams which show two embodiments of circle app interface, where social networks having popular VR or AR content are presented in a map setting in accordance with the present invention.

REFERENCE NUMERALS IN DRAWINGS

| | | | |
|---|---|---|---|
| 10 | Camera | 12 | Device |
| 14 | Processor | 16 | Computer Readable Medium |
| 18 | GPS Sensor | 20 | NFC Sensor |
| 22 | Device | 24 | Screen |
| 26 | Smartphone | 28 | User Device |
| 30 | Screen | 32 | User Device |
| 34 | Screen | 36 | Device |
| 38 | Screen | 40 | Device |
| 42 | Screen | 44 | Button |
| 46 | Button | 48 | Button |
| 50 | Button | 52 | Button |
| 54 | Button | 56 | Button |
| 58 | Button | 60 | Window |
| 62 | Window | 64 | Button |
| 66 | Button | 68 | Button |
| 70 | Icon | 72 | Window |
| 74 | Button | 76 | Button |
| 78 | Window | 80 | Button |
| 82 | Button | 84 | Button |
| 86 | Button | | |

100, 102, 104, 106, 108, 110, 112, 114, 116, 118, 120, 124, 126, 128, 130, 132, 134, 136, 138, 140, 142, 144, 146, 148, 150, 152, 154, 156, 158, 160, 162, 164, 166, 168, 170, 172, 174, 176, 178, 180, 182, 184, and 186 are exemplary steps.

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types.

A social networking environment may involve a networking system and multiple user devices. A networking system may contain multiple servers. User devices and network system are connected via communication networks. One or more social networks may be implemented or administered by the networking system in the environment.

The word "server" means a system or systems which may have similar functions and capacities as one or more servers. Main components of a server may include one or more processors, which control and process data and information by executing software, logic, code, or stored executable instructions, or carrying out any other suitable functions. A server and/or processor, as a computing device, may include any hardware, firmware, software, or a combination. In the most compact form, thanks to the advance of microelectronic technologies, a server may be built on a single processor chip.

A networking system may enable and implement various types of social networks serving a great number of users. It may exemplarily be divided into three blocks, represented by server, database, and router and switch. A server may comprise one or more servers processing applications, web applications, images, emails, networking, searching tasks, etc. The database may store data associated with users, networks, servers, and various services. Router and switch may transmit information packets between a user device and a networking system over communication networks and work as a gatekeeper to and from the networks. As social networks may involve a tremendous amount of data, which may be uploaded and aggregated by networking systems continuously, a separate database system may be created. A database system may include a large number of storage devices or modules and specialty servers for data management and maintenance.

Figure 1:
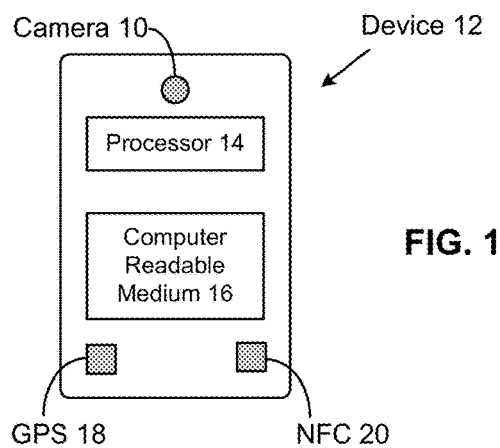
FIG. 1 is an exemplary block diagram describing a user device embodiment in accordance with the present invention.

FIG. 1 is an illustrative block diagram of one embodiment according to the present invention. A device 12 may represent a user device or a wireless electronic device, including but not limited to mobile phone, smart phone, smart watch, other wearable device, handheld computer, tablet computer, desktop computer, virtual reality (VR) device, augmented reality (AR) device, and the like. Device 12 may include a processor 14 and computer readable medium 16. Processor 14 may mean one or more processor chips or systems. Medium 16 may include a memory hierarchy built by one or more memory chips or storage modules like RAM, ROM, FLASH, magnetic, optical and/or thermal storage devices. Processor 14 may run programs or sets of executable instructions stored in medium 16 for performing various functions and tasks, e.g., surfing on the Internet, placing phone calls, logging on a website, playing video or music, gaming, electronic payment, social networking, sending and receiving emails, short messages, files, and data, executing other applications, etc. Device 12 may also include input, output, and communication components, which may be individual modules or integrated with processor 14. Communication components may connect the device to a server or another device via a communication network. Usually, Device 12 may have a display (not shown in FIG. 1 for brevity reason) and a graphical user interface (GUI). A display may have liquid crystal display (LCD) screen, organic light emitting diode (OLED) screen (including active matrix OLED (AMOLED) screen), or LED screen. A screen surface may be sensitive to touches, i.e., sensitive to haptic and/or tactile contact with a user, especially in the case of smart phone, tablet computer, smart watch, and certain wearable devices. A touch screen may be used as a convenient tool for a user to enter inputs and interact with a system. Furthermore, device 12 may also have a voice recognition component for receiving verbal commands or audio inputs from a user. For VR and AR devices and some wearable devices, a virtual screen or screen having a very small size may be arranged. While it is inconvenient or impractical to touch such a screen, verbal commands and gesture instructions may become useful for users.

A communication network which device 12 may access may cover a range of entities such as the Internet or the World Wide Web, a local area network (LAN), a wide area network (WAN), a metropolitan area network (MAN), a telephone network, an intranet, wireless, and other types of networks. Device 12 may be connected to a network by various wired, wireless, optical, infrared, ultrasonic or other communication means. Via communication networks, device 12 may communicate with a remote server of a networking system or service center to send and receive data or messages.

Device 12 may include a camera sensor 10. Sensor 10 may be a regular phone camera module used by users to take pictures in daily life. The camera sensor may be arranged to scan quick response (QR) codes, one-dimensional barcodes, or any other machine-readable codes with the help of certain application. QR codes or barcodes may be printed out and displayed for public use easily.

Device 12 may include a global positioning system (GPS) 18. Sensor 18 may enable a device to get its own location info. Besides GPS, device location may also be obtained using wireless triangulation methods, or other suitable technology, which may be prepared by a service provider or on-site service facility. Usually for indoor or some urban environment, positioning methods other than GPS are used, since GPS requires a clear view of the sky or clear line of sight for four GPS satellites.

Furthermore, device 12 may have near-field communication (NFC) capability enabled by NFC sensor 20. NFC is of short-range wireless communication technology and may be employed to communicate securely between NFC devices. Sensor 20 may also be used to read a radio-frequency identification (RFID) tag. RFID is also a wireless technology for the purpose of transferring data, such as identification data, passively or actively. A RFID chip or RFID tag may be made very small in size, e.g., smaller or much smaller than one millimeter. It may be manufactured by semiconductor technologies. In application, a RFID tag may be conveniently placed, for instance, on a table or wall for public use.

Inside device 12, output signals of sensors may be transmitted to processor 14, which, employed with certain algorithm, may process the data and act according to predefined programs. For instance, processor 14 may process data from NFC sensor 20, transmit certain messages to a networking system or service center, and then wait for instructions or new messages from the system or center.

Figure 2:
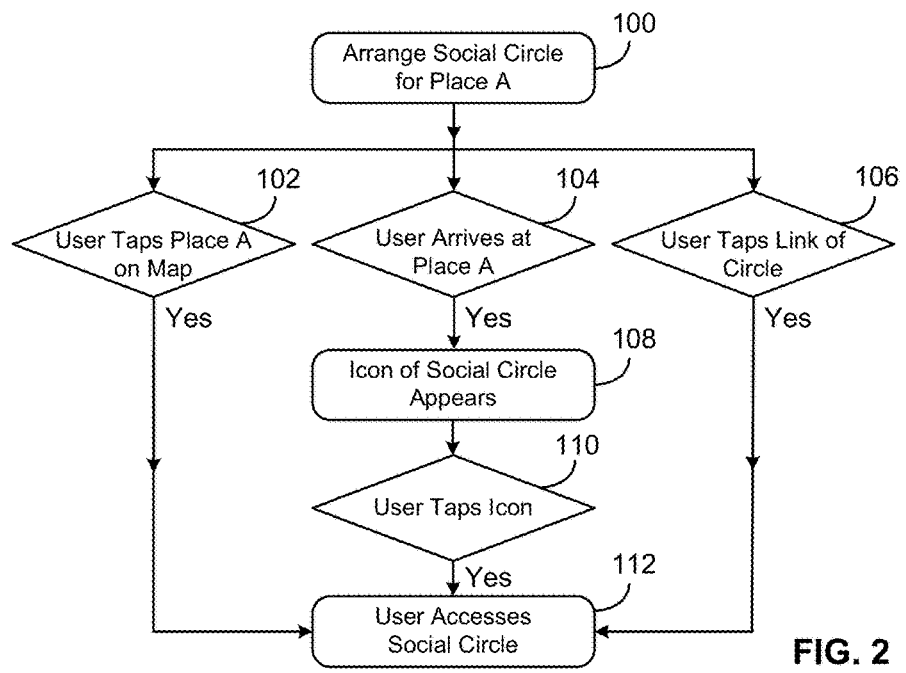
FIG. 2 is an exemplary flow diagram showing an embodiment of arranging and accessing a social network in accordance with the present invention.

FIG. 2 is a schematic flow diagram showing one embodiment of arranging and accessing a location-based open social network. Assume that a social network or social networking circle is established for Place A by service center in Step 100. The social circle is open to all users without any need of invitation, recommendation, verification, and registration. A user has several options to access the circle. In Step 102, a user may tap an interactive icon on a map presented on a touch-sensitive screen. The icon may bear name of the circle or the place. Once the icon is tapped, a user enters the circle and a circle interface shows up on the screen in Step 112. A user may also access a social circle via traditional method, i.e., by finding and tapping a link representing the circle in Step 106.

For location-based networks, being there at the place may be utilized to provide ease and convenience for finding and accessing a corresponding social circle. In Step 104, assume a user arrives at Place A, which may be detected by GPS, the triangulation method, or other techniques. The user starts a circle app at a user device. A circle app may mean an application which implements social circle functions, instructs a user device to obtain data, and assists a user to find, access and perform tasks in social circles. Next the device sends the user's location data to service center, which in turn gets info about a social circle created for the place. Service center sends circle info to the device and a circle icon appears on a device screen in Step 108. The user sees the circle icon and then taps it in Step 110. Almost instantly, the user enters or accesses the circle in Step 112. After a user opens a circle app at a place, a social circle related to the place may be presented on screen right away. So, a user may just need to recognize a circle icon and tap on it to access the circle. The process to find and access a social circle is straightforward, simple, and easy.

FIG. 3 is a graphic diagram showing the interface of a circle app schematically. Assume that a device 36 has a touch-sensitive screen 38. After a user launches a social networking app, device 36 starts contacting service center and transmits location info. Service center receives the info, retrieves from database circle information related to user location, and then sends it to device 36. Once circle information is obtained, it is presented in the app interface. As in the figure, interactive icons "Fresh Mart Circle", "Stadium Circle", and "Union Square Circle", and the user's own location are displayed on a map. The circles may correspond to a store, a stadium, and a public square respectively. Circle icons may be placed at each circle's location on a map. Circle location may be a location or place which is determined when a circle is generated. When an entity has a physical location, the location may be assigned to a circle of the entity and be called the circle's location. For instance, location of Fresh Mart Circle is of the store site and location of Stadium Circle is of the stadium. A user may simply and conveniently tap a circle icon to log in a circle. It is noted that a circle icon on a map may be found and accessed by a user from a remote place. For instance, a user may log on the website of service center, retrieve a map, zoom in to see a place, and then find a target circle icon around the place. Then, the user may tap the icon to enter the circle. In another embodiment, the map mode of interface may be replaced by the textual mode, where a list containing circle icons may be presented. For instance, after a user opens a circle app, circle info may be retrieved from service center and presented by a list of circle icons on screen. Next, a user may choose and tap an icon to enter a circle.

FIG. 4 shows a schematic flow diagram of accessing a social network. Assume that a user arrives at a place and launches a circle app in Step 114. Next, a user device, a service carrier, or an on-site facility starts to collect location data in Step 116. Depending on the program setting, a user may register a place via various ways, since there are several technologies available for location detection. "Register" as a verb means a user causes submission of location records to service center actively or passively to provide evidence of being present at a place.

In Step 118, positioning technique such as GPS or the triangulation method is used to get user location automatically and directly. GPS method requires a GPS sensor, such as sensor 18 of FIG. 1, while the triangulation method may be conducted by an on-site facility or a wireless service carrier.

In Step 120, RFID technology is used. A RFID tag may be displayed for public use at a place. If a user device has a NFC sensor, like sensor 20 of FIG. 1, a user may swing the device in front of a RFID tag to read it. A RFID tag may contain location info and link data so that it may assist a user device to log in a social circle directly. Alternatively, a RFID may be designed as a location indicator, that is, the tag only provides location data to a user device. The user device then sends the data to service center to let the center know where a user is.

Step 122 introduces QR code method, which works in a way similar to RFID. The code may contain login instructions for a circle or just info of a location. As a location indicator, RFID tag and QR code may provide precise geographic information. They are especially useful when positioning method is not available, not preferred due to privacy concerns, or not precise enough. But RFID and QR-code methods are not automatic and they require a user to take action, either swiping a device in front of a tag or aiming at and scanning a QR code.

A user's location may also be determined by a user himself or herself via a verbal method as in Step 124. With voice recognition technology, a user may speak to a device the name of a place or a venue. The verbal method is not only useful, but also convenient, as saying a word or a few words is all it takes.

Step 126 employs a map method. The method is convenient for on-site users when user location is not precise. For instance, when user location can't be determined accurately enough and there is no RFID tag or QR code printout in sight, a user may open a circle app and select map mode. Next, an interactive map may appear on screen. A user may search the map and find a spot of interest. The user then taps the spot, which may be designed as a confirmation act to specify location of interest.

Once a user's location info is obtained, it is sent to service center in Step 128. The center then decides which social circle should be presented to a user based on location data and predetermined arrangement. It may be designed that a location-based open social circle has a defined geographic coverage or a designated geographic circle area. The shape and range of a designated circle area may be defined by service centre or proposed by an entity which a circle is assigned to. When a circle area is submitted by an entity, service center may evaluate it and approve it with changes or without any change. If a user's location is in a circle's designated area, the circle may be selected and presented to the user. Since social circles' designated areas may overlap, a user may be located at a place claimed by multiple circles. In such a case, multiple circles may be presented to the user for selection.

Alternatively, a designated geographic user area or designated user area may be defined. All social circles whose location is in a designated user area may be considered relevant to a user and may be selected and presented to the user. A designated user area may have any shape and dimension specified by service center or a user. For instance, a designated user area may have a circular shape whose center is of a user's location. The circular area's radius may be defined by service center as a default setting which may be adjusted by a user. Examples of radius value include one mile to ten miles. If the radius is of one mile, social circles whose location is within a one-mile range may be chosen and provided to the user. It is noted that selected social circles may be presented in map or textual mode at a user device. In map mode, a map is displayed which covers a designated user area. The map may have square, rectangular, or another shape. Circles may show up as interactive icons on map. In textual mode, interactive circle icons may form a list or appear on a list.

After obtaining info of social circles, service center sends it to a user device for presentation. In Step 130, a user ponders whether to visit a circle while still at a place close to it. The user makes a decision, and accesses a circle in Step 134. When the user is busy, he or she may access a circle at a later time in Step 132. As circle info is received, it may be recorded at a user device. An interactive "History" button may be configured in circle app interface. Once a user taps "History" button, circles encountered within a defined time period in the past, e.g., three days or a week, may show up on screen. A user may tap one circle to log in.

Figure 5:
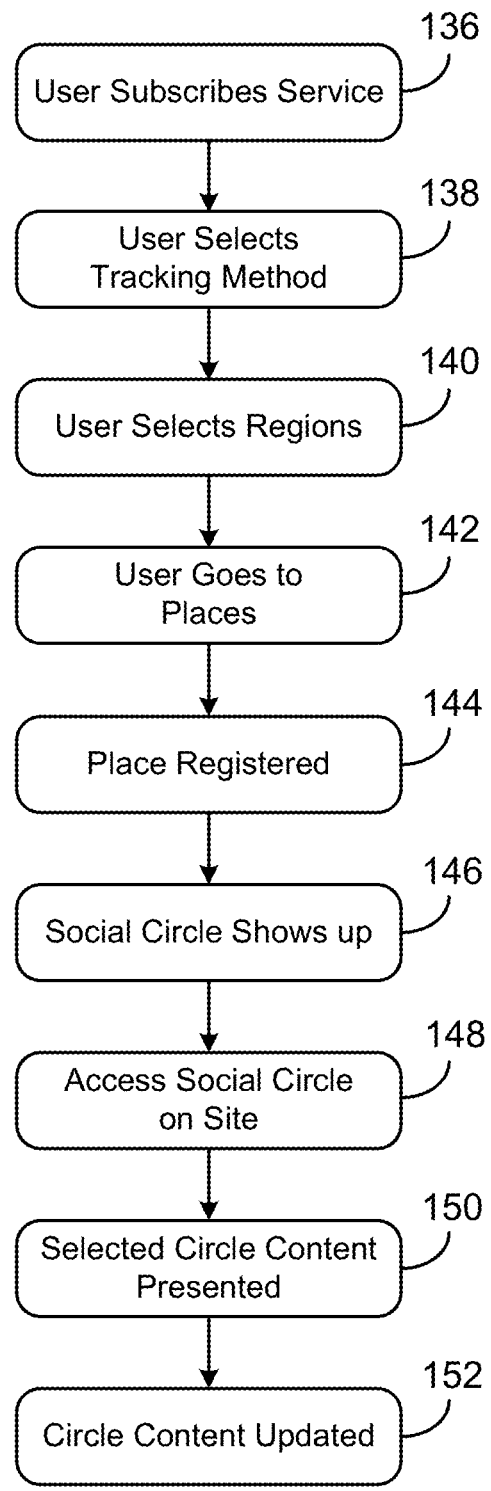

FIG. 5 shows an exemplary flow diagram of accessing a social network from another angle. In order to participate in activities of location-based social networking circles, a user may start by opening an account or subscribing networking service at service center in Step 136. The procedure may be required for users who want to issue post in social networking circles. If a user is not registered, he or she may access content of a social circle, but may not be allowed to post anything. Thus social circles discussed here are configured open to all users, but only registered user may post messages. A circle app may be downloaded from the website of service center and installed at a user device. During app installation, a user may be asked to submit info such as name, email address, place of residence, and preferred user name. As a result, service center may know a user's identity and other personal info, and thus may be able to help the user log in certain social circles without another round of registration process and without a password. Consequently, a user may carry a user name registered at service center and use it in various participating social circles. The arrangement makes a social circle free of registration and in the meantime, a user doesn't need to create a user name for every circle encountered. When a user doesn't want to use a registered user name in a social circle, the user may choose an option to get a temporary user name assigned for use in that circle.

In Step 138, a user selects options of tracking scheme. As location data is a critical part of the social circle program, a user may decide which detection method would be employed. Location data contains sensitive information, so some users may be concerned about privacy issues. For instance, some may not want service center to know all places he or she has been to. As a result, automatic positioning methods like GPS and the triangulation method may be turned off, while manual operation such as RFID, QR code, verbal, or map scheme may be selected, which means location records are collected and reported only after a user initiates it. In practice, a user may place a user device close to a RFID tag to read it, arrange a phone camera to aim at a QR code to scan it, speak to a user device, or tap a circle icon on a map. Next the user device transmits location info to service center. When the GPS method is selected and a GPS device is turned on, a circle app may acquire location info and send the user's location records to service center automatically, assuming the circle app is started already. Next, service center may analyze the user's location records and obtain info of suitable location-based circle or circles. Circle info may be transferred to the user device subsequently. If triangulation or another positioning technology such as ultrasonic method is selected, the user's location records may be collected and sent to service center automatically from a contracted service, still assuming a circle app is on. When a circle app is off and a user arrives at a place, a user device may not communicate with service center and submit or help submit location records. But a user may authorize service provider or service facility to collect his or her location records and transfer the records to service center. Thus whether a circle app is on or off, places may be registered automatically.

In Step 140, a user selects regions of interest. As a user may pass many places on a routine basis, a lot of social circles may be registered regularly. A user may like some social circles and dislike some other circles. So there is a need to avoid registering certain places and limit the quantity of social circles in daily life. A user may single out some places or regions and stay away from social circles associated with those locations. After a user delists a place to avoid it, corresponding social circles may not appear even the place is registered by the user.

As a user goes out in Step 142, commuting to work or doing things after work, he or she may register places automatically or manually. Assume that a user turns on a circle app and registers a place in Step 144. Then an icon of a social circle shows up in the app interface on a device screen in Step 146. The social circle may represent a network assigned to the place. After a while, if the user goes to another place, the original icon may be replaced automatically by another icon corresponding to another social circle. In Step 148, the user taps an icon of a circle, which prompts the device to send a message to service center. Service center then starts retrieving info about the circle and sends it to the device. In Step 150, a response from service center is received and circle info is presented on the device screen. It may be designed that service center selects certain content based upon prearranged conditions and only sends selected posts to a user. For instance, assume a user device is set up to display twenty messages or less on screen at a time. Then service center retrieves and sends the latest twenty or less messages each time. Quantity limit of message may be arranged to make life less complicated. Service center may choose a value as the limit or a user may have options to select a value. With a quantity limit, old messages are deleted automatically when new messages are published. Thus content on a device screen may get updated by itself once new messages are received from service center. In Step 152, update of circle content is performed.

Figure 6:
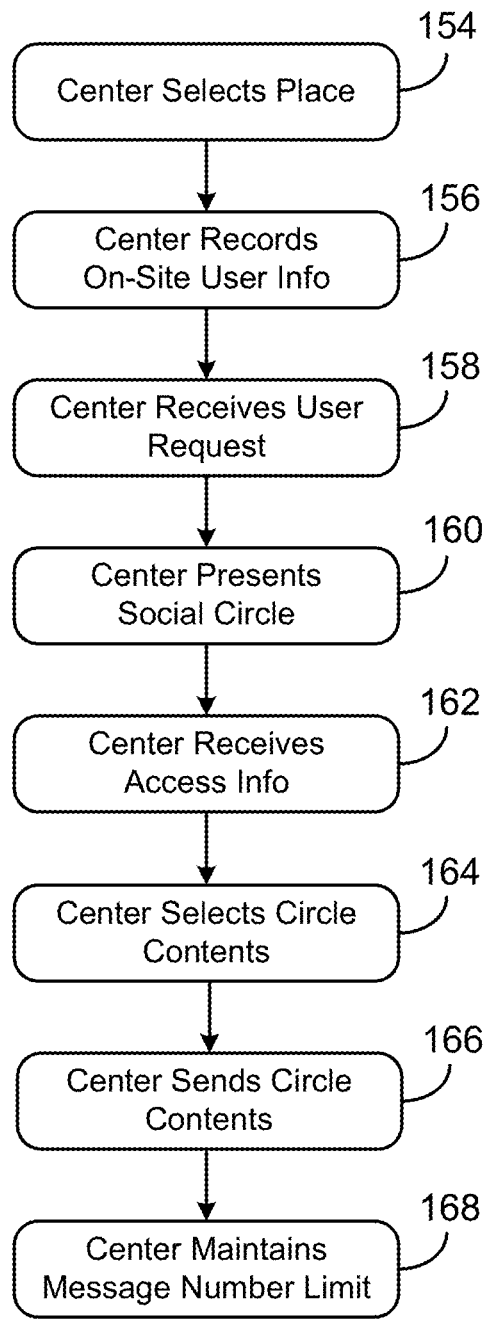
FIG. 6 is an exemplary flow diagram which illustrates management of social network in accordance with the present invention.

FIG. 6 shows a schematic flow diagram in regard to social network formation and administration. Assume service center is in charge of social network creation and management. Service center may get connected to a user device via various communication networks. As a great number of locations may be suitable for setting up social circles, it is up to the center to decide which location or region shall be chosen. Service center may generate many social networks for many locations respectively. For a location, multiple networks may be created to cover different time blocks such as consecutive days. Since an open network discussed here may have unlimited time span, usually only one network is arranged for a location. Thus it may be configured that some selected locations each may be assigned a single social network only. Service center may generate lots of networks matching lots of locations one by one. In Step 154, service center picks a location and announces creation of a social circle associated with the place publically. The location may be a subway station, a shopping mall, a public square, a sports venue, a park, or any other place where a crowd may gather. As discussed, such a social circle is arranged accessible through several methods. Service center monitors presence of registered users at the location when permitted and records the users' location info in Step 156.

In Step 158, service center receives a request for circle info from an on-site user, which may happen after the user launches a social circle app at a user device and looks for available networks. The user's request and location info are passed to service center automatically. Service center performs a search based on info received to get circles at and around the user location. Then in Step 160, the center sends one or more circle names to the user device, which are presented on a display for the user to review. Next in Step 162, the center receives selection info from the user, who taps a circle icon on screen. Assume that service center has the info that the message quantity has a limit at the user device. In Step 164, service center retrieves the latest messages, for instance, the latest twenty messages if the limit is twenty. The selected circle content is transmitted to the user device for presentation in Step 166. After a while, new messages are posted in the circle. Service center updates a message list while keeps the message number below the limit in Step 168. Updated messages are sent to the user device. The user device may display a fixed number of messages, while the newest messages replace the oldest ones continuously and automatically.

FIG. 7 shows a schematic flow diagram to illustrate management of social networking circle. As proposed, users may access a location-based social circle conveniently after arriving at and registering a place. Such users may be called "local users", since they are there locally. In addition, an open circle may also be accessed by users who are not there, whether registered or unregistered. These users may be called "remote users". A remote user may be close to the place or thousands of miles away from it.

More specifically, it may be defined that a user is considered local for a networking circle if the user is physically located in the circle's range or a designated circle area. On the other hand, when a circle's range covers a user's location, the circle may be called the user's "local networking circle". A designated circle area may be defined by service center. The area may also be suggested by a user such as a business who requested to set up a circle for business use. Service center may approve a user-requested circle area after evaluation. A designated circle area may have a circular shape centered at a spot with a given radius. The spot may be a business location if it is a business circle. Radius of the area may be of, for instance, a couple of miles or tens of miles. In addition, a designated circle area may have other shapes or irregular shapes depending on actual geographic and demographic features. The shape and dimensions of a designated circle area are editable or adjustable by service center. When a circle represents a business or entity, the business or entity may be allowed to edit or adjust the shape and dimensions of the designated circle area under certain conditions. After a user opens a circle app, service center may get the user's location data and find local networking circles whose range or designated area covers the location.

When a user is located out of a designated circle area, the user may be considered as a remote user to a social circle; and at the same time, the social circle may be considered as a remote circle for the user. After a user opens a circle app at a device, the app interface may be designed to show circle info obtained from service center. Three options may be arranged for presenting social circles. A user may choose one of them after entering "Edit" mode. In the options, circles presented may include local circles only, circles within a designated user area only, or local circles plus remote circles which are relatively close to the user's location in a predefined area. In the second and/or third option, icons of local circles may be arranged to have different color or different appearance from remote circles for easy recognition. In a circle app interface, social circles may be presented by circle icons organized in a list or scattered on a map.

Both local and remote registered users may post messages in a social circle. When a great number of users actively participate in circle activities, a large number of posts may be created. Thus there is a need to separate posts generated by local users and remote users. Location-based circle is related to a place, and thus it is likely that info provided by local users may be more relevant and more appealing. When there are a lot of posts from remote users, further division may be arranged to avoid presenting too many posts in one window at a time. For instance, posts from remote users may be grouped by users' locations, such as regions or countries.

Moreover, it may be designed that all users have default invisible mode initially. And a user may switch between invisible and visible mode. The word "visible" may mean a user name or temporary user name shows up on a circle page after a user enters a circle so that other users may see it. For instance, if a user accesses a circle with visible mode, his or her user name may be displayed on a list from a circle page which is accessible to all users. After a visible user logs out or leaves circle interface, name of the user is removed. On the contrary, the word "invisible" may mean one person's user name is not publicized in a circle. If a user is invisible in a circle, his or her user name does not appear on a member list when the user is visiting the circle and reading messages posted there. Thus users in a circle are not able to see the user name of an invisible user and not able to know whether an invisible user enters the circle. When a user is visible or invisible in a circle, the user may be considered in visible or invisible mode respectively. The word "mode" means a status or state of a user when the user is in a circle. Location-based social circles proposed here are open to all users. Most users in a circle may not know each other and may not want to know each other for various reasons. Many users who enter a circle may just want to see what other people talk about. Therefore, most users may prefer the invisible mode. But when a user posts a message, the message may show a user name or a temporary name assigned for use in one circle only. A temporary name may be used to protect user privacy when a user doesn't want to expose his or her user name.

For location-based social circles, there are users who had registered a place and may access a circle anytime, but never logged in. These users are omitted here and not discussed. For unregistered users, it may be arranged that they are in the invisible mode all the time.

If a user enters a circle, but doesn't post any content, the user may be called "watcher". In a sense, unregistered users are also watchers. When a registered user chooses to be a watcher, the user may like to be in the invisible mode, watching what happens in a circle quietly and stealthily. While watchers don't contribute to posts in a social circle, the circle may still benefit from them as watchers enhance the strength of audience. When the audience is strong, a circle may attract more users, since many people have a tendency to see what a crowd pays attention to.

Back to FIG. 7. Assume that service center creates a social circle in Step 170. Next, the center decides whether to allow remote users to issues posts in the circle in Step 172. There might be different arguments about posts generated by remote users. First, the number of remote users may be unlimited, since any user may enter a circle, which may render too many posts for a viewer to handle. Second, remote users are more likely to post irrelevant messages, causing distraction and annoyance. But interaction and info exchange between the local and remote users are important and encouraged in general. Therefore, it's up to service center to make a decision according to each case. If remote users are not allowed to post any, messages are generated by local users only, as in Step 174. If remote users are allowed to post content, messages issued by local and remote users may be displayed together along a time line. However, when many messages are posted, there is a need to group messages to provide convenience for viewers. In Step 176, two message windows are arranged. All users may view the windows. After a user posts a message in Step 178, service center determines whether the poster is a local user or not in Step 180. If a poster is a remote user, the message is displayed in window B in Step 182, which is a dedicated place for posts from remote users. If a poster is a local user, the user may have two options in Step 184. The user may post it in window B, for interaction with remote users, or post it in window A to keep conversation among local users in Step 186. Window A is arranged for publishing messages from local users only.

FIG. 8 depicts a schematic diagram of social circle interface. A user device 22 has a display screen 24. Screen 24 shows two windows in the social circle interface. A window on the left displays messages from local users and the other on the right presents messages from both local and remote users. For a remote user, the window on the left is viewable only. When messages from remote users reach a limit, they may be divided further by user location. In case posts from remote users are grouped by user location, a user may choose an option to display in the right window messages from domestic remote users at one time, and from international users at another time. It may be designed that a message posted in a circle shows the user name or temporary user name of the poster and the place where the poster is located. If a user doesn't want to expose his or her location, the user may be considered a remote user even when the user has registered a local place.

FIG. 9 uses graphic diagrams to show accessing a social circle through an interactive map when a user location is only known roughly. Take smartphone as a user device. Assume that a circle app is started at a smartphone 26. In the circle interface, a "Map" button may be configured (not shown in figure for brevity reason). When "Map" button is activated, map mode takes over. A map with interactive icons or objects appears on screen in Step 1. Alternatively, map mode may be arranged for a starting page of an app interface. Since the user location is unclear, a map in large scale may be presented. Next, a user double taps on a screen spot to zoom in as depicted in Step 2. After zooming in, icons of some social circles show up on the map, including Circle 1, Circle 2, and Circle 3 at different places. These icons are interactive. In Step 3, the user selects Circle 2 and taps its icon on screen. Then in Step 4, the interface of Circle 2 appears on the screen of phone 26, which also means entry of the circle. Next, the user may view messages, post messages, or do other things. Thus, it is seen that accessing a social circle is simple, easy, and convenient via a map. No registration. No password. A user just starts a circle app on a site, opens an interactive map, finds a place of interest, and taps on a circle icon to access a circle.

The screen view of map setting in FIG. 9 may be used as a starting page when a user starts a circle app and the user location is not known precisely. With rough data of the user location, obtained from a wireless service provider for instance, an area may be determined approximately. Thus a map may be presented showing an area which a user may be in and may have interest. A user may select a circle on the map right away or do it after zooming in. When the user location is known, a predetermined map area may be specified by service center, the circle app, or the setup. The predetermined area may be of a designated user area which is discussed above or may overlap a designated user area with certain degree. For instance, if a designated user area is circular, a map may show the exact circular area or a square which covers the circular area with close dimensions.

A map area in the starting interface may also be an area which is large enough to include locations of local circles, where the designated circle area of each circle may cover the user's location. Setup of the map area in the starting interface may be edited by a user. For instance, a user may change the shape of the map area from square to rectangular. After a map area is determined, service center may discover all networking circles whose location is in the area and send circle information to the user for presentation. On the user device side, info from service center may be received and then displayed in the interface. For instance, a screen may show circle icons distributed on a map. Circle icons may contain a circle name and/or logo and be located at a place close to the circle location on a map. Characteristic values of a circle may be added to an icon or placed beside it. The characteristic values may include the number of users who are currently logging in a circle and the amount of messages posted within a given time in a circle. Service center may arrange a default setting to show or not to show a characteristic value in a starting interface. Options may be arranged for a user to change the setting. Thus, what may appear on screen when a circle app is launched may be adjusted by a user. Besides the user number and message amount, a special on-screen label may be added to a circle which has the most log-in users or most messages issued within certain time. For instance, a user may select a function such that a circle icon may appear on screen with a label saying "Most Users" or "Most Messages" when a circle app is started or after a search process is conducted. It makes it easy for a user to find out the most active circle.

FIGS. 10 and 11 show functions of social circle using exemplary diagrams. When a user is at a location and wants to enter a circle related to the location, the user may log in the circle easily and conveniently as illustrated in FIGS. 4 and 5. However, for a user staying at home, there may be too many social circles to choose from. It may be hard and frustrating to search for an interesting and dynamic social circle. Therefore, there exists a need for service center to provide tips to help users navigate among a great amount of social networks.

In FIG. 10, a screen 30 of a user device 28 shows a map interface. The map is interactive since it contains interactive icons or buttons representing links to social circles besides regular map symbols and legends. On a map, an icon of a location-based circle may be configured at or next to the circle's location. So a map may present the geographic distribution of social circles visually. In the figure, "Map of City" shows three social circles exemplarily. The configuration has a title "Post Quantity". Beside a circle icon, there is a number showing post quantity and a bar whose height reflects the quantity, which is the number of messages posted in a circle during a given period of time. The time period may be determined by service center with a value such as past five to thirty minutes or even several days. It is seen that Circles A, B, and C each have 20, 35, and 5 messages generated. As circles with more activities are more attractive, a user may choose Circle A or B to join. The interface may be switched from a circle app interface in textual mode. For instance, after a user taps "Map" button in a circle interface, a map may show up. Center of the map may be of the user's location. The map may be arranged to show one or more social circles which exist in the map area. Each social circle may be represented by an interactive icon. When an icon is tapped or activated, a social circle interface may appear on screen 30, showing content of a social circle. A map may also contain other interactive icons representing website of a business, an organization, or an event which is associated with a location in a map area. These features are often seen on a typical online map. But since a user may be more interested in social circles, a "Circle Only" button may be arranged on screen. A user may activate "Circle Only" button on a screen to show interactive icons of social circles only, while other interactive icons and buttons may be removed from the screen view. Info received from service center may contain post quantity data to prepare for a user request. When a user wants to compare activities among circles on a map, the user may tap "Show Post Quantity" button. Then post quantity data is retrieved and quantity bars and numbers may emerge beside circle icons as in the figure. While in map mode, a user may adjust map scale to view a larger or smaller region on screen.

FIG. 11 shows the same city map with the same social circles on a screen 34 of a device 32. Instead of posts issued, number of users in each circle is presented by a label showing the number and a bar reflecting the number. Users counted may include visible members, invisible members, and unregistered users who are accessing a circle. Members mean registered users here and unregistered users are arranged invisible. The height of a bar next to a circle icon reflects total number of users whose device showing a circle interface while the users may do things like reading posts, writing messages, or checking around in the circle. When a circle attracts lots of users, it may be viewed as something interesting may be happening. Thus for some users, it may be worth to take a look. A user may open a circle app, get in map mode, and then tap "Show User Number" button to have a map showing social circles along with a number and a bar representing each circle's user quantity. A user may search new places by changing map scale or map area, tap an icon of a popular circle which may host a large number of users, and then enter it to find out what is going on.

FIG. 12 illustrates an exemplary circle app interface in map mode. The interface, presented on a screen 42 of a device 40, shows a map dotted with social circles in a window 62. Assume that the app is called "Circle Master" and the map is called "Map of City". There are interactive buttons beside the map. A "Setup" button 44 is arranged for changing conditions of the map, such as the size of the map area, the shape of the map, the scale of the map, the center of the map, the circle category, one or more keywords, etc. A user may tap button 44 to open a setup window where changes may be made. If the map in window 62 only shows names and locations of social circles, a user may tap a button 46. Then a number shows up beside each circle which is the number of users who are currently accessing the circle. A user may also tap a button 48 to see post quantities issued in each circle within a given time period, which may be any value like between one hour to a couple of days or a even longer period. The post quantities may appear beside each circle on the map. When textual content is needed, a user may tap a button 50 to switch the interface from the map mode to the text mode.

Sometimes, a user may be interested in a social circle related to a particular event, such as a famous festival, a major sports game, a big ceremony, a traffic incident, a weather phenomenon, breaking news of other kinds, etc.

Thus there exists a need to have a search function. A search may be carried out using keywords or category as search query. Keywords may include a name of a place, a symbol, one or more words associated with a topic, etc. If a name of a place or a region is submitted, service center may retrieve social circles at or around the place or in the region only. Search results may be presented in textual or map mode. The textual mode, like the current search results, may feature a list of circles with a website link or a brief introduction to each one. In the map mode, search results may be shown on a map, such as circle icons scattered in a map area, as each location-based circle is related to a place. In the map mode, if a user changes a search query, different circles may show up at the same place or different locations on a map. So a user may use the search function to find desirable social circles in a region conveniently.

For ease of use, service center may categorize social circles or rename a circle temporarily. For instance, when there is no specific topic, a circle may belong to casual talk category; when a circle is related to a place where a public event is happening or happened within a short period of time and conversation in the circle is about the event, the circle may belong to public event category for some time; when a circle is related to a place where breaking news is happening, the circle may belong to breaking news category and be renamed after the breaking news temporarily, such as "Grand Parade Circle". Again, a user may select the textual mode or map mode. When an event happens at a place and attracts attention around the world, users on the scene may log in a local circle and report what is happening, and users everywhere may find the circle and access it to learn the first-hand information from people in the front.

Back to FIG. 12. A "Search" button 56 is arranged in the interface for enabling a search task. Once button 56 is activated, it prompts the circle app to send a search request to search center. Beneath button 56, a "Category" button 58 is configured. A use may tap button 56 to see a list of categories and then select one to limit a search within the category. A user may also enter one or more keywords in an entry window 60. When a user submits a new query except a location name, a map may remain the same scale, while different social circles may appear at the same or different places. Since the map scale may be adjusted to display a smaller or larger area, it may be used as another query element in a search process. Similarly, post quantity or user number may be utilized as query element too. For instance, a user may key in "user number" or "post quantity" in entry window 60, and then tap button 56 to launch a search. When a search is based on user number or post quantity, a given number of circles which have top user numbers or post quantities are retrieved and presented. The circles may come from all categories if the category limit is not entered.

Since users in an open social circle may not know each other, after they leave the circle, they may not want to know what happened in the circle, like who posted what post. Hence, it may be designed that service center will not send to a user any message about activities in a social circle after the user logs out of the circle. However, if a user does want to be informed of what happened in a circle anytime, the user may tap a "Be a Follower" button 54, as displayed in FIG. 12. Once button 54 is activated, a window appears where a user may select a social circle to follow it. Following a circle or being a follower of a circle means a user gets a notification when there is one or more new posts issued in the circle or other predetermined events occur. A follower must be a registered user so that service center knows how to contact him or her. A follower may choose to be visible or invisible. Arrangement of the follower serves two purposes.

First, some users may want to know the activities of a social circle after they leave there. For instance, a popular social circle may have loyal fans. Second, a user may enter a circle arranged for a location in order to get info from someone. But sometimes, there may be no users who are currently accessing the circle. For instance, a social circle of a remote small town may be empty without any users quite often. If the circle of the small town has followers, a visitor may post a question even though there is no user there. And then a notification may be sent to the circle's followers. Hopefully, one of the followers may read the notification and provide an answer to the question in time.

Since there may be a large quantity of open social circles, a user may find it hard to decide which circle is the best. Some users may log in several circles to try them out one by one. Some users may just want to join a circle which has the most users who are accessing the circle. Thus, a "Popular Now" button 52 may be configured on screen 42. After a user taps button 52, a request is sent to service center by the circle app. The request contains info about an area defined by the user along with other conditions, such as a category or a keyword. For instance, if a user John arranges an area in window 62, selects a category, and enters a keyword, the info is passed to service center. Next service center may retrieve information on selected social circles which are related to the arranged area, such as circles whose locations are within the arranged area, belong to the selected category, and are related to the keyword. The center then finds out which circle has the most users or participants among the selected circles. A participant of a circle may be a registered, unregistered, local, remote, visible, or invisible user who is accessing the circle or logging in the circle. Then service center identifies a popular circle which has the most participants and sends to user John content presented at the popular circle.

Service center may send content of a popular circle, which has the most users, continuously for a given period of time. The content may include at least the main part which is presented at the popular circle so that a user may read posts just published, watch video clips just uploaded, or share a streaming event happening at the popular circle. A short time like one to two minutes before the given period of time elapses, service center may reevaluate the situation. If the previously popular circle still has the most participants, content presented at the circle may be transmitted to the user continuously for another round, i.e., another given period of time. If it is detected that another circle has the most participants now, service center may stop sending content presented at the previous popular circle at the end of the given period of time. Next, the center may send to the user content presented at the new popular circle for the given period of time. Hence, service center may automatically switch from one social circle to another one to send a user popular content among selected social circles continuously. Hence, a user may tap button 52 to view content from a social circle which has the most participants currently and to view content from another social circle which has the most participants at a later time.

FIG. 13 illustrates an exemplary circle app interface on screen 42 of device 40, which may show up when button 52 of FIG. 12 is tapped by a user or requester. Above a window 72, there is a title "Popular Now—Circle 3". The title means that Circle 3 has the most users and window 72 is showing content of Circle 3, which may be, for instance, streaming media, assuming that Circle 3 is a streaming platform. The show of streaming media may continue for a given period of time, for instance, five to twenty minutes. After that, service center may keep sending content presented at Circle 3 for another round, if Circle 3 retains the most participants. If Circle 1 has the most participants after the given period of time, service center may start sending content presented at Circle 1 and sending it continuously for the given period of time.

If a user wants to stay with a circle which has the most participants currently, the user may tap a "Stay Here" button 64 on screen 42. Upon activation of button 64, the circle app sends a message to service center to request staying with the current circle. Then service center may keep sending content presented at the current circle for an unlimited period of time. On the other hand, if a user doesn't like the current circle, the user may tap a "Switch Now" button 66. Then a request is sent to service center by the circle app. After service center receives the message that button 66 is activated, the center may select another circle, such as a circle with the most or the second most participants, and send content presented at the circle to the user.

If a user wants to adjust the given period of time, he or she may tap a "Setup" button 68. Then a setup window may show up. The user may change the given time period during which content presented at a popular circle is sent continuously.

In the setup window, the user may also change the category of social circles, the geographic area, one or more keywords entered previously, a list of unwanted circles, the size of window 72, and so on. A list of unwanted circles may include circles which a user doesn't like and wants to avoid. The geographic area may be adjusted by changing the center location or the radius of a circular region. The geographic area may also be adjusted by changing the name of a city, a region, or a country. An option, such as "Select All Areas", may be arranged which means all places are chosen, that is, the geographic area covers the whole world. After a user adjusts the geographic area, a new area is defined. Next, a message is sent to service center to report the change by the circle app. The center then retrieves social circles related to the new area and subsequently determines a social circle which has the most participants. Then the center starts sending to the user content presented at the circle that has the most participants. Similarly, when a category or keyword is changed, service center starts selecting new social circles, finds a new popular circle among the newly selected circles, and sends to a user content presented at the new popular circle.

In above discussions, it is assumed that social networks are location based. Alternatively, a check box may be arranged beside a "Location Based Circles Only" sign in the setup window (Not shown in the figure). The check box may be checked in a default setting. If a user wants to include social circles which are not based on a location, the box may be unchecked. After the check box is unchecked, a social circle's geographic data becomes irrelevant. Resultantly, service center may select circles and determine a popular circle with the most users based on limitations excluding geographic factors.

If service center detects that a previously popular circle no longer has the most users, content presented at another circle which has the most users may be presented after a given period of time ends. The change of social circle is performed automatically at service center. Before the presentation is switched from one circle to another one, a "Switch Soon" icon 70 may be lightened to alert a user for a short period of time, like ten to twenty seconds. The user may tap a "Yes" button 74 to approve it or push a "No" button 76 to object it. If button 74 is activated, content from a new circle may be presented after a given time period elapses. If button 76 is pushed, content from the current circle may be presented for another round. In the absence of user input, it may be considered that the user approves the change of social circle.

FIG. 14 illustrates another exemplary circle app interface on screen 42 of device 40. The embodiment provides convenience for users looking for popular VR or AR content. When a user has a VR or AR device, such as a VR headset, an AR headset, a pair of VR glasses, a pair of AR glasses, and so on, the user may want to watch popular VR or AR media content. Some social circles may have VR or AR content. A user may download it after logging in a circle and then watch it. If a circle has a streaming platform and provides streaming service, a user may also watch VR or AR content through a streaming process. In the figure, a button 80 has a sign "Show Popular VR/AR". After a user starts app "Circle Master", a map may appear in a window 78 on screen 42, showing social circles related to various locations on the map. If the user taps button 80, a marker or sign may be added to circles that have popular VR or AR content, e.g., a letter "R". Assume that circles 1, 2, and 5 have popular VR or AR content among circles 1 to 5. Hence, letter "R" is attached to circles 1, 2 and 5 respectively, as shown in the figure, which makes it easy to identify the circles. Then, the user may tap one among circles 1, 2, and 5 to enter a network. Next another interface may show up displaying content of the network. The user may find a VR or AR show and start downloading or streaming the media content.

Popular VR or AR content may be of content which has more viewers than other VR or AR content. A given number of social circles, such as ten to twenty circles, may be selected based on the number of viewers of VR or AR content. The selected social circles each have VR or AR content that has more viewers than VR or AR content provided by other social circles. The number of viewers of VR or AR content in a circle may include the number of download of VR and AR content there plus the number of streaming cases of VR and AR content in a given time period, such as from a few hours to a few days. A streaming case may represent a VR or AR content streaming process which lasts at least certain time, say ten minutes to thirty minutes. Additionally, when a certain percentage of a VR or AR show is streamed, say at least twenty to fifty percent, the steaming process may also be counted as a streaming case. Viewers counted may include users who download or stream any VR and AR shows in a circle. Thus, when a social circle has popular VR or AR content, the popular VR or AR content may include one or more shows and/or programs. Alternatively, viewer numbers of every VR or AR show or program in each circle may be compared individually, instead of comparing total viewer quantities of all VR and AR content of each circle. In such a case, if a social circle has popular VR or AR content, it means the circle has a VR or AR show or program which has more viewers than each of VR and AR shows and programs provided at a certain number of other circles.

After a user activates button 80 by, for instance, tapping it, the circle app sends a message to service center. The message contains a request for circles having popular VR or AR content. If window 78 already shows some social circles on a map, the message may include the info as well. Then service center may retrieve viewer quantity info about the circles on the map from a database and select circles which have the popular content. The map may be a default map based on a user's geographic location after the user launches a circle app. The map may also be a map after a user submits certain conditions or makes certain changes. For instance, a user may input a location name or use a fingertip to adjust a map in window 78. Then a new region is determined which is covered by the map. Service center may select social circles related to the region and send info on the selected circles to a user for presentation. Next, if the user requests for circles of popular VR or AR content, service center may retrieve info on viewer quantities of circles related to the region from a database and determine a given number of circles which have popular VR or AR content. Service center then sends the user info about circles of popular VR or AR content. The info sent to the user may also include viewer numbers, depending on prearrangements. Viewer numbers of the selected circles may be presented to the user.

A user may obtain new social circles by adjusting a map in window 78, like zooming in, zooming out, or changing places. A user may also obtain new circles by choosing a category or using key words. For instance, a "Category" button may be configured on screen 42 (not shown in the figure). A user may tap it and then choose one from a category list, which may include, for example, sports, shopping, comedy, scenery, and so forth. An input window may also be configured on screen 42 (not shown in the figure). A user may enter key words which are related to social circles of interest. Key words may include a name of an event, a person, a subject, a location, etc. When a location name is submitted, social circles related to the location may be selected. After a category is chosen and/or key words are submitted, a request for circles of popular VR or AR content may include the info. After service center receives it, it selects circles from a database based on the info plus some common factors.

A checkbox with an exemplary sign "Location Related" may be configured in window 78 (not shown in the figure) too. The checkbox may be in checked state at the beginning as a default setting, meaning the location factor is involved in social circle selection and circles chosen are location related. Optionally, a user may uncheck the box to exclude the location factor in search and/or selection processes. When the box is unchecked, the circle app interface may be switched from map mode to textual mode automatically. Resultantly, service center may select social circles without considering the location factor. Thus, social circles presented to a user may include networks that are not location related.

As there is a need for textual format, a "Text Mode" button 84 is configured on screen 42 in FIG. 14. After a user tap button 84, circles in window 78 may be presented by a list along with other text content. If a user taps button 80 while in textual mode, information sent to service center may include the user's location, if available, and other info which may be selected or submitted by the user. Service center may determine a region based on the information, obtain social circles related to the region, retrieve viewer quantity info, and then select a given quantity of circles that have popular VR or AR content.

A user may change certain default values using a setup button 86. For instance, after button 86 is activated, a window may show up, where a user may make changes on certain factors or conditions, such as the time period during which the viewer number is calculated, the number of selected social circles that have popular VR or AR content, whether the viewer quantity corresponds to an individual VR or AR show or program of a circle or all VR and AR shows and programs in a circle, etc. In addition, it is assumed that VR or AR content, as used herein, may include mixed reality (MR) media content when MR content is available.

As some users may be interested in circles of popular VR or AR content only, a button 82 is configured. Once button 82 is activated, social circles which don't have popular VR or AR content are removed from the map. Hence, only social circles which have popular VR or AV content are presented, as illustrated graphically in FIG. 15, which shows yet another embodiment according to the present invention. If the interface is in textual mode, social circles which don't have popular VR or AR content are removed from a circle list and removed from the interface. Thus all circles on a circle list have popular VR or AR content.

CONCLUSION, RAMIFICATIONS, AND SCOPE

Thus it can be seen that systems and methods are introduced to provide improved location-based social networks.

The improved method and system have the following features and advantages:
(1). Location-based social circles are arranged open to all users;
(2). On-site users may access a social circle conveniently via several methods;
(3). Users may find and access a social circle via an interactive map;
(4). Messages generated by local and remote users are placed in separate windows;
(5). The post quantity and number of users of a social circle are presented as a selection guide;
(6). Social network is searchable on a map through keywords or category;
(7). Content of a network which has the most users is sent to a requester continuously for a given period of time upon a request; and
(8). A given number of social networks that have more viewers of VR or AR content are selected and sent to a user.

Although the description above contains many specificities, these should not be construed as limiting the scope of the invention but as merely providing illustrations of some of the presently preferred embodiments. Numerous modifications will be obvious to those skilled in the art.

Ramifications

Social networking circle as discussed above works as a platform for two-way communication. For instance, local and remote users may post messages as well as viewing messages. On the other hand, a social circle may be designed as a platform aimed for one-way communication. One-way communication means users may view messages, but aren't allowed to post messages. For instance, a networking circle representing a business like a restaurant may favor one-way feature, when the business wants to post information for customers to view but doesn't have the manpower to handle instant inquiries. No matter one-way or two-way, a social circle may act as a platform of promotion and advertisement for a business. Methods introduced above may be used for social circles of both types when the methods are applicable.

A user may speak to a device to enter instructions using voice recognition techniques. For instance, after a user arrives at a place, the user may say "circle app" to a device to launch a circle program. Next a circle interface may show up on screen with one or more icons of social circles presented. The user may take a look at a circle list or circle icons on a map and say a circle name to enter a circle. A user may also say the name of a button to activate it, which is equal to tapping the button. For instance, a user may say "Popular now" and then watch a program presented at a popular circle which has the most users.

As aforementioned, service center may decide whether a social circle should be arranged for a place or location. In real life, service center may not know all needs of users. Thus, users, especially business and organization entities, may request service center to create a location-based social circle. And service center may evaluate it, approve the request, and set up a circle. For instance, a retail store may want to establish a location-based circle of its own. In such a case, the store may provide location data of store to service center. To accommodate users' positioning or registering needs, the store may prepare RFID tag, QR code, and/or other positioning method for users. Aside from business and organization, an individual user may also request to arrange a circle for a place or a group gathering at a place. For social circles originated from request outside service center, a label such as "Sponsored Circle" and the name of the originator may be shown in a circle interface. Display of the label and the originator's name may be mandatory since such kind of circle may be used for the advantage of certain group or person. Service center may collect fees for creating and maintaining user-initiated circles.

When there are a lot of messages in a social circle, a user may have a hard time to find out whether other users have replied to his or her post or a reply may be removed due to the quantity or time limit. For instance, if a quantity limit or time range is arranged, a reply may be with the deleted posts which are off limit or out of range. Thus, a "Reply" button may be created at the circle interface. When there is a reply, color of the button may change. A user may tap the "Reply" button to access one or more replies from other users regarding a post the user made at an earlier time, and may respond to a reply to continue a conversation.

Because location-based open social circles are accessible to all users, many posts may be generated given a potential huge number of users who may access a circle and write a message. Thus a user may be overwhelmed by lots of messages and the messages may become a burden. Therefore, setting up a presentation limit may help some users. Since most users in a location-based circle don't know each other, some may be interested in activities which are happening and may not want to know much from past conversations. Such users may like a quantity limit for messages presented on a user device. For instance, if the limit is of twenty, a user device may only display twenty messages each time, which are the latest twenty messages and are updated constantly when new messages are issued. For a user with moderate interest in what happened in a circle, a time limit may be used. The time limit may be any value. If it is of thirty minutes, a user device may display posts generated in the past thirty minutes without message quantity limitation. A message list may be updated periodically as time goes by. When a user is deeply attached to a circle, the user may choose to save all posts in a circle and have all posts accessible at any time. For instance, a user may tap a "Setup" button, like button 44 in FIG. 12. The button may lead to a setup window where a user may choose options like "Message Quantity Limit", "Time Limit", and "Location Limit". A user may enter a number for quantity limit or a value for time limit. A time limit may be of half hour, one hour, two hours, or the maximum value allowed. A user may use a location limit to get circles from a certain region only. For instance, some users may be interested in social circles from a certain location only.

In many discussions presented, "tap" as a verb is used as an action to activate an interactive icon or button. It is noted that a tap action may be replaced by other moves, like click or verbal instructions when it is doable.

Lastly, in aforementioned discussions, QR codes may be replaced by other machine readable codes without affecting proposed functionality, such as one-dimensional bar codes, as long as the codes contain info required and are readable by a user device.

Therefore the scope of the invention should be determined by the appended claims and their legal equivalents, rather than by the examples given.

The invention claimed is:

1. An apparatus having stored executable instructions, comprising:
   1) at least one computing system being operable to implement a social networking system, the social networking system implementing a plurality of social networks;
   2) the plurality of social networks each accessible without registration requirements;
   3) the social networking system arranged to select a given number of first social networks among the plurality of social networks after receiving a request from a user, the first social networks each having virtual reality or augmented reality content that has more viewers than virtual reality or augmented reality content provided at each of rest of the plurality of social networks; and
   4) the social networking system arranged to send the user information about the first social networks.

2. The apparatus according to claim 1 wherein the plurality of social networks are related to a region.

3. The apparatus according to claim 2 wherein the region is determined based on the user's geographic location.

4. The apparatus according to claim 2 wherein the region is determined based on the user's input.

5. The apparatus according to claim 1 wherein the first social networks each have a virtual reality or augmented reality show or program that has more viewers than each of virtual reality and augmented reality shows and programs provided at rest of the plurality of social networks.

6. The apparatus according to claim 1 wherein the plurality of social networks are related to a category which the user selects.

7. The apparatus according to claim 1 wherein the plurality of social networks are related to keywords submitted by the user.

8. A computer-implemented method, comprising:
   1) receiving a request from a user;
   2) retrieving information about a plurality of social networks, wherein each of the plurality of social networks is accessible without registration requirements;
   3) selecting a given number of first social networks among the plurality of social networks, the first social networks each having virtual reality or augmented reality content that has more viewers than virtual reality or augmented reality content provided at each of rest of the plurality of social networks; and
   4) sending the user information about the first social networks.

9. The method according to claim 8 wherein the plurality of social networks are related to a region.

10. The method according to claim 9 wherein the region is determined based on the user's geographic location.

11. The method according to claim 9 wherein the region is determined based on the user's input.

12. The method according to claim 8 wherein the first social networks each have a virtual reality or augmented reality show or program that has more viewers than each of virtual reality and augmented reality shows and programs provided at rest of the plurality of social networks.

13. The method according to claim 8 wherein the plurality of social networks are related to a category which the user selects.

14. The method according to claim 8 wherein the plurality of social networks are related to keywords submitted by the user.

15. A computer-implemented method, comprising:
1) receiving a request from a user;
2) selecting a plurality of social networks based on the request, the plurality of social networks accessible without registration requirements;
3) obtaining info about viewers in regard to virtual reality or augmented reality content provided at each of the plurality of social networks respectively;
4) selecting a given number of first social networks among the plurality of social networks, the first social networks each having more viewers of virtual reality or augmented reality content than each of rest of the plurality of social networks; and
5) sending the user information about the first social networks.

16. The method according to claim 15 wherein the plurality of social networks are related to a region.

17. The method according to claim 16 wherein the region is determined based on the user's geographic location.

18. The method according to claim 16 wherein the region is determined based on the user's input.

19. The method according to claim 15 wherein the plurality of social networks are related to a category which the user selects.

20. The method according to claim 15 wherein the plurality of social networks are related to keywords submitted by the user.

* * * * *